Figure 1:
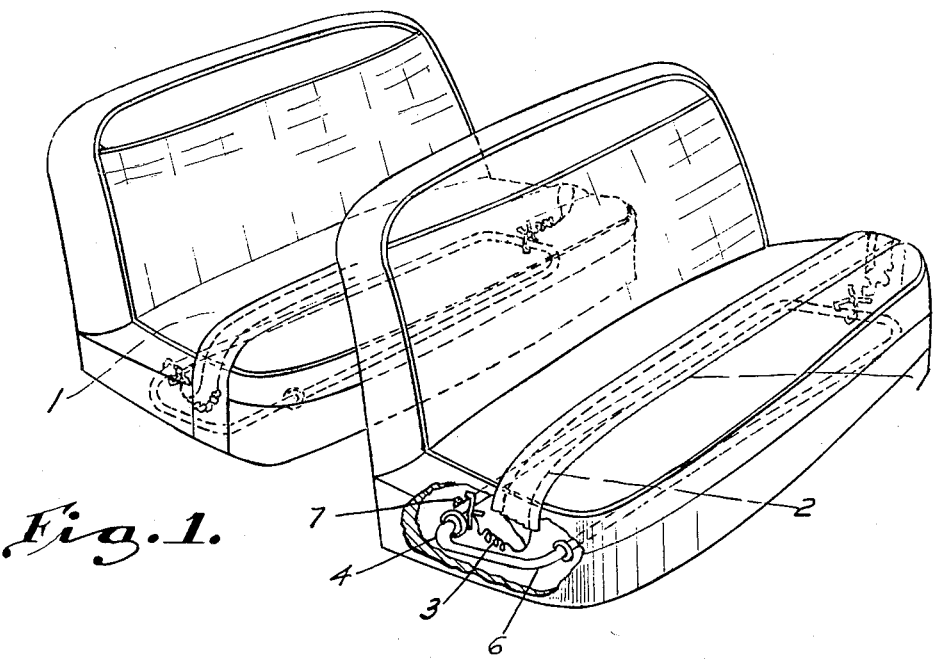

June 19, 1956   C. C. ADAMS   2,751,523
ELIMINATING STATIC ELECTRIC SHOCK FROM AUTOMOBILE SEAT COVERS
Filed Jan. 2, 1953

Clifford C. Adams
INVENTOR.
BY Chas. Lenegre
Attorney.

United States Patent Office 2,751,523
Patented June 19, 1956

2,751,523

ELIMINATING STATIC ELECTRIC SHOCK FROM AUTOMOBILE SEAT COVERS

Clifford C. Adams, Birmingham, Ala.

Application January 2, 1953, Serial No. 329,253

2 Claims. (Cl. 317—2)

This invention relates to eliminating static electric shock, especially with reference to operators and users of automobiles having their upholstery covered with plastic material seat covers. Such static shocks are especially prevalent in cold weather when woolen clothing is worn. The sliding contact of the woolen clothing with the plastic material produces a considerable charge of static which is discharged when the person moves a hand close to or in contact with a door handle or other metallic part of the car. Such shocks are seriously objectionable to a nervous, sensitive person.

Further objects are to provide such eliminating means that will be highly satisfactory for the purpose intended, simple in structure, cheap to manufacture, easy to install, and extremely durable.

Other objects and advantages will appear from the drawing and description.

Figures 2, 3:
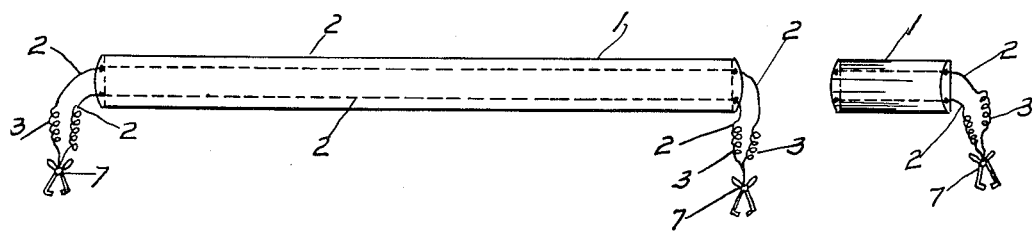
Figure 4:
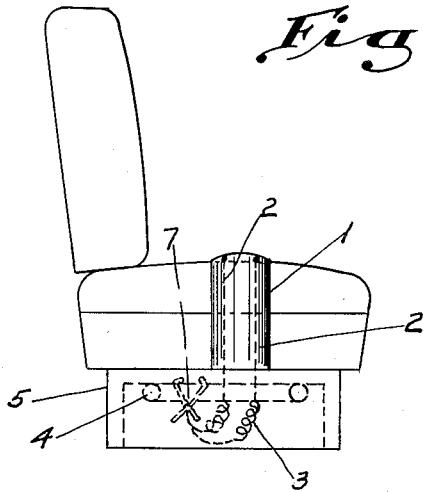

By referring generally to the drawing, a part of this application, it will be observed that Fig. 1 is a perspective view of automobile seats with seat covers thereon and static eleminating devices according to the present invention attached to the seats; Fig. 2 is a plan view of an eliminating device; Fig. 3 is an end view of Fig. 2; and Fig. 4 is an end elevational view showing how an end of the device is attached for holding the eliminating device adjacent the face of the seat.

Similar reference numerals refer to similar parts throughout the several views.

Referring to the drawing in detail it will be seen that the eliminating device comprises a strip of fabric or similar material 1 having wires 2, preferably made of copper, woven into the top of the strip with the wires partly exposed in order to make easy contact with the clothing of a person on the seat. Coil springs 3 are attached to the ends of the strips and brackets 4 or the like on the supports 5 or ends 6 of the seats. The ends of the springs have clips 7 for easy attaching, but the strips may be attached in any manner that will hold the strips tightly adjacent the seats.

The various parts of the strips may be made of any material suitable for the purpose, but I prefer to use non-stretchable fabric, copper wire in the strips, and steel spring wire for holding the ends in taut positions. Also the parts may be made in different sizes and capacities, depending on the kinds and sizes of seats on which to be used.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. A device of the character described comprising a strip of flexible material, pieces of wire woven into said strip with part of the wire exposed in one face of the material, a steel wire coil spring attached to the ends of the wire at each end of the material, a fastening wire clip on the end of each steel wire spring, said strip of material with wire therein being of a size to fit upon and along the center portion of an automobile seat cushion with the said clips in contact with the metal structure of the automobile.

2. A device of the character described for eliminating static electric shock comprising, a strip of electric non-conducting material, said material being flexible, a plurality of lengths of wire woven into said strip on one face thereof with the wire pieces partly and evenly exposed above one face of the material designated as the upper face, said wire pieces extending beyond the ends of the strip, a substantially stiff steel wire coil spring attached to the wires at each end of the strip, a fastening clip on each coil spring end of a size and shape for attachment to the metal structure of an automobile seat adjacent the ends of the seat.

References Cited in the file of this patent

UNITED STATES PATENTS

| | | |
|---|---|---|
| 1,419,261 | Howard | June 13, 1922 |
| 1,744,004 | Hunt | Jan. 14, 1930 |
| 2,244,635 | Williamson | June 3, 1941 |
| 2,302,065 | Siegling | Nov. 17, 1942 |